(12) United States Patent
Moriyama

(10) Patent No.: US 7,177,525 B2
(45) Date of Patent: Feb. 13, 2007

(54) DIGITAL WATERMARK EMBEDDING METHOD, DIGITAL WATERMARK EMBEDDING APPARATUS AND RECORDING MEDIUM HAVING A DIGITAL WATERMARK

(75) Inventor: Yoshiaki Moriyama, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 1159 days.

(21) Appl. No.: 10/073,020

(22) Filed: Feb. 12, 2002

(65) Prior Publication Data

US 2002/0110361 A1 Aug. 15, 2002

(30) Foreign Application Priority Data

Feb. 13, 2001 (JP) .................... P2001-035006

(51) Int. Cl.
H04N 5/76 (2006.01)
H04N 7/167 (2006.01)
G11B 15/04 (2006.01)
G11B 19/04 (2006.01)

(52) U.S. Cl. .................. 386/94; 360/60; 380/201; 380/210

(58) Field of Classification Search ................. 386/94, 386/1; 360/60; 713/176; 380/210, 201; 382/100
See application file for complete search history.

(56) References Cited

U.S. PATENT DOCUMENTS 6,226,387 B1 * 5/2001 Tewfik et al. ............... 382/100
6,665,417 B1 * 12/2003 Yoshiura et al. ............ 382/100
7,027,611 B2 * 4/2006 Hashimoto .................. 382/100

FOREIGN PATENT DOCUMENTS

| CN | 1 229 548 A | 9/1999 |
| CN | 1 260 565 A | 7/2000 |
| EP | 1 006 722 A2 | 6/2000 |
| EP | 1006722 A2 | 7/2000 |
| EP | 1 032 205 A2 | 8/2000 |
| WO | WO 98/12835 A1 | 3/1998 |
| WO | WO 00/70523 A1 | 11/2000 |
| WO | WO 02/23905 A1 | 3/2002 |
| WO | WO 02/50832 A1 | 6/2002 |

OTHER PUBLICATIONS

Nikolaidis N et al: "Robust image watermarking in the spatial domain" Signal Processing, Elsevier Science Publishers B.V. Amsterdam, NL, vol. 66, No. 3, May 28, 1998, pp. 385-403, XP004124959.

* cited by examiner

Primary Examiner—Thai Q. Tran
Assistant Examiner—Nigar Chowdhury
(74) Attorney, Agent, or Firm—Sughrue Mion, PLLC (57) ABSTRACT

This invention provides a digital watermark embedding method that is a method of embedding a digital watermark, which is generated according to specific rules, in contents comprising digital data, and increases the strength of the digital watermark corresponding to content during a predetermined time period at the beginning of the digital watermark.

10 Claims, 9 Drawing Sheets

MOVIE COMPANY EQUIPMENT

VIDEO TRANSMISSION APPARATUS AT BROADCASTING STATION

DIGITAL WATERMARK EMBEDDING METHOD, DIGITAL WATERMARK EMBEDDING APPARATUS AND RECORDING MEDIUM HAVING A DIGITAL WATERMARK

BACKGROUND OF THE INVENTION

1. Field of the Invention

This invention is related to a digital watermark embedding method for embedding a digital watermark in order to restrict copying contents from digital data.

2. Description of the Related Art

With the realization of digital television broadcasting, distribution of video images using a digital signal has become commonplace. Also, video recorders that record video images as digital data onto an optical disk or magnetic tape have become widespread. By making it possible to record video images as digital data, it becomes possible to make copies without deteriorating the video image. Therefore, from the aspect of copyrights, it is necessary to restrict the copying of video images.

The digital watermark technique disclosed in EP1006722A2 (corresponding to Japanese Patent Application Laid-open 2000-173175) is one technique of restricting copying of video images, and is a technique of embedding data in the digital video image for restricting copying. Hereafter, the data for restricting copying that is embedded in the digital image is called a digital watermark. A digital watermark is embedded such that it is hidden in the video. Therefore, there is none or very little decrease in quality of the video even with the digital watermark embedded in the video. Also, a person who receives a video having an embedded digital watermark can probably not tell that there is a digital watermark in that video, so it is extremely difficult to remove the digital watermark from the video.

In EP1006722A2, a system, which uses a digital watermark that indicates that copying is prohibited and a digital watermark that indicates that first-generation copying is allowed, is disclosed. With this system, it is possible to manage the number of times copying is allowed, so copyright problems do not occur, and it is possible for the viewer of a television broadcast to view a transmitted video without putting constraints on the broadcast time.

In this system, when the digital video is input to the video recorder, the video recorder determines whether or not there is a digital watermark in the video. When there is a digital watermark and that digital watermark indicates that copying is prohibited, the video recorder will not record that video. Moreover, when there is no digital watermark, or when there is a digital watermark and that digital watermark indicates that first-generation copying is allowed, the video recorder determines that it is allowed to record that video and records the video on an optical disk or the like.

In the case of broadcasting a video from a broadcast station, normally, a plurality of video contents are broadcast continuously. Therefore, control data for copying the video, or in other words, data such as data prohibiting copying, data allowing first-generation copying or data allowing copying, are broadcast continuously together with differing video contents. For example, it is possible that video contents, for which copying is allowed, will be broadcast after broadcasting video contents, for which copying is prohibited.

However, in order for the video recorder to detect whether or not there is a digital watermark requires a certain amount of time (for example 1 to 30 seconds). Therefore, it is not possible for detection to quickly follow the switching of video contents, and so for the beginning part of the following video contents, control data that differ from the actual control data are identified by the video recorder. For example, even though the video contents are switched from allowing copying to prohibiting copying, there is a problem that the beginning part of the following video content is copied. Moreover, in the case where the video contents are switched from allowing copying to allowing first-generation copying, normally, since a digital watermark indicating that copying is finished is further embedded in the video contents in which first-generation copying is allowed and the video contents are scrambled and recorded, there is a problem that the digital watermark indicating that copying is finished is not embedded at the beginning of the following video contents, so the contents are not scrambled.

SUMMARY OF THE INVENTION

The object of this invention is to provide a method of embedding a digital watermark that will do away with the problem of the delay in detecting the control data.

The digital watermark embedding method of this invention embeds a digital watermark, which is a signal generated according to specific rules, in contents comprising digital data, and increases a strength of the digital watermark forcefully during a predetermined time period ($t_0$) at a beginning of the digital watermark corresponding to the contents (11).

In this invention, the strength of the digital watermark implies that i) a signal level of the digital watermark, ii) a spatial range of the digital watermark when it is embedded in part of a video signal (increase with extent), iii) a time range of the digital watermark when it is embedded in part of a video signal (increase with time ratio).

According to this invention, since the strength of the digital watermark corresponding to the contents is increased during a predetermined time period at the beginning of the digital watermark, it is possible to detect the digital watermark added to the contents reliably and immediately.

During a predetermined time period, the strength of the digital watermark can be set to a constant value, and can be increased up to a predetermined magnification with respect to the strength in the other time period. Further, during a predetermined time period, the strength of the digital watermark can be set to a predetermined value obtained by adding a constant value to the strength in the other time period.

Moreover, a beginning of the digital watermark can be prior to a beginning of the contents. In this case, it is possible to compensate for the time to detect the digital watermark at a receiver side, and to bring the timing for detecting the digital watermark close to that of the beginning of the video contents sufficiently. Therefore, control timing for allowing/prohibiting copying at the receiver side can be more appropriate than that in the above-mentioned aspect.

The digital watermark embedding apparatus (401) of this invention is an apparatus that embeds a digital watermark, which is a signal generated according to specific rules, in contents comprising digital data, and it increases a strength of the digital watermark forcefully during a predetermined time period ($t_0$) at a beginning of the digital watermark corresponding to the contents (11).

According to this invention, since the strength of the digital watermark corresponding to the contents is increased during a predetermined time period at the beginning of the digital watermark, it is possible to detect the digital watermark added to the contents reliably and immediately.

During a predetermined time period, the strength of the digital watermark can be set to a constant value, and can be increased up to a predetermined magnification with respect to the strength in the other time period. Further, during a predetermined time period, the strength of the digital watermark can be set to a predetermined value obtained by adding a constant value to the strength in the other time period.

Moreover, an output timing of the beginning of the digital watermark can be prior to that of the beginning of the contents. In this case, it is possible to compensate for the time to detect the digital watermark at a receiver side, and to bring the timing for detecting the digital watermark close to that of the beginning of the video contents sufficiently. Therefore, control timing for allowing/prohibiting copying at the receiver side can be more appropriate than that in the above-mentioned aspect.

The recording medium having a digital watermark of this invention is a recording medium (423) having a digital watermark, which is a signal generated according to specific rules, embedded in contents comprising digital data, and where the strength of the digital watermark corresponding to the contents (11) is forcefully increased during a predetermined time period at the beginning of the digital watermark corresponding to the contents.

According to this invention, since the strength of the digital watermark corresponding to the contents is increased during a predetermined time period at the beginning of the digital watermark, it is possible to detect the digital watermark added to the contents reliably and immediately.

During a predetermined time period, the strength of the digital watermark can be set to a constant value, and can be increased up to a predetermined magnification with respect to the strength in the other time period. Further, during a predetermined time period, the strength of the digital watermark can be set to a predetermined value obtained by adding a constant value to the strength in the other time period.

Moreover, a beginning of the digital watermark can be prior to a beginning of the contents. In this case, it is possible to compensate for the time to detect the digital watermark at a receiver side, and to bring the timing for detecting the digital watermark close to that of the beginning of the video contents sufficiently. Therefore, control timing for allowing/ prohibiting copying at the receiver side can be more appropriate than that in the above-mentioned aspect.

In order to more easily understand this invention, reference numbers have been used in the supplied drawings, however the present invention is not limited to the for shown in the drawings.

DESCRIPTION OF THE PREFERRED EMBODIMENTS

—First Embodiment—

A first embodiment of the digital watermark embedding method of this invention will be explained with reference to the drawings FIG. 1 through FIG. 10. This embodiment shows an example of using video contents as the contents comprising digital data, however, this invention can also be applied to other contents comprising digital data, such as music contents.

(Restricting Recording and Copying of Digital Video)

Figure 1:
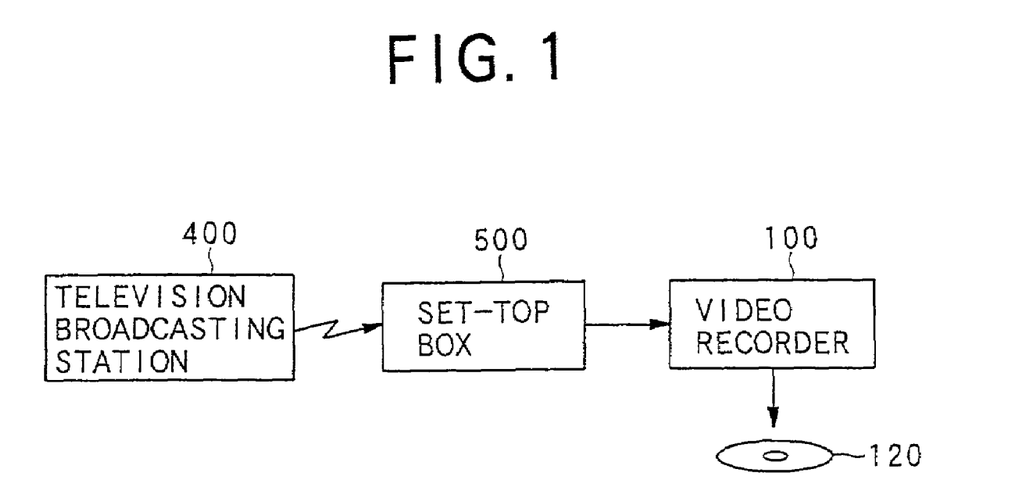
FIG. 1 is a diagram showing the flow of a digital video that is distributed from a television station.
Figure 2:
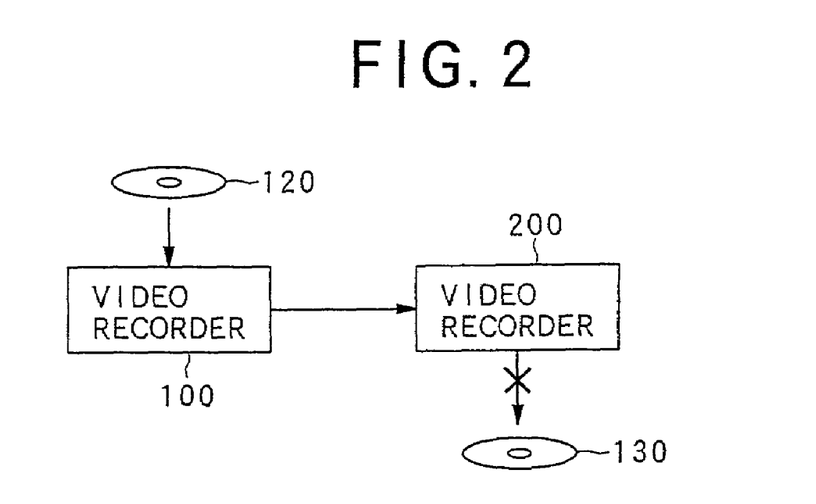
FIG. 2 is a diagram showing a method of managing the generations of copying a digital video.

First, FIG. 1 and FIG. 2 will be used to explain the restrictions on recording and copying using the video recorder of this embodiment of the invention.

As shown in FIG. 1, digital video is distributed from a television broadcast station 400. In the step before distributing the video from the television broadcast station 400, a watermark (digital watermark) is embedded in digital video such as a movie for which it is necessary to restrict copying due to copyright reasons.

The digital watermarks of this embodiment include a watermark that indicates first-generation copying is allowed, and a watermark that indicates that copying is prohibited. First-generation copying is allowed for digital video embedded with a watermark indicating that first-generating copying is allowed, however, copying for the second generation on is not allowed. Copying is not allowed at all for digital video embedded with a watermark indicating that copying is prohibited. In the case that there is no watermark embedded in the digital video, copying of that digital video is allowed as desired.

For example, in the case that a watermark indicating that first-generation copying is allowed is embedded in the digital video that is distributed from the television broadcast station 400, the receiver of the digital video is allowed to record the distributed digital video onto an optical disk only one time, so it is possible to view the distributed video without putting constraints on broadcast time.

The digital video that is distributed from the television broadcast station 400 is received by a set-top box 500, and is then sent to the video recorder 100 from the set-top box 500. The video recorder 100 detects the watermark that indicates that first-generation copying is allowed and records that digital video onto an optical disk 120. When doing this, the video recorder 100 embeds a watermark in the digital video, which has been embedded indicating that first-generation copying is allowed, indicating that copying has been completed, then records that digital video onto an optical disk 120.

Also, as shown in FIG. 2, the video recorder 100 is able to read and play the digital video that was distributed from the television broadcasting station 400 and recorded on the optical disk 120, and output that digital video digitally to another video recorder 200 having the same configuration as the video recorder 100. However, since a watermark, indicating that copying is finished, is embedded in the digital video that has been recorded one time on the optical disk 120 by the video recorder 100, the video recorder 200 cannot record the digital video onto another optical disk 130. In other words, the video recorder 200 detects the watermark that is embedded in the digital video indicating that copying has been completed, and does not record that digital video. Copying of the digital video is restricted and generations of copying the digital video are managed in this way.

(Explanation of the Video Transmission Apparatus)

Figure 3:
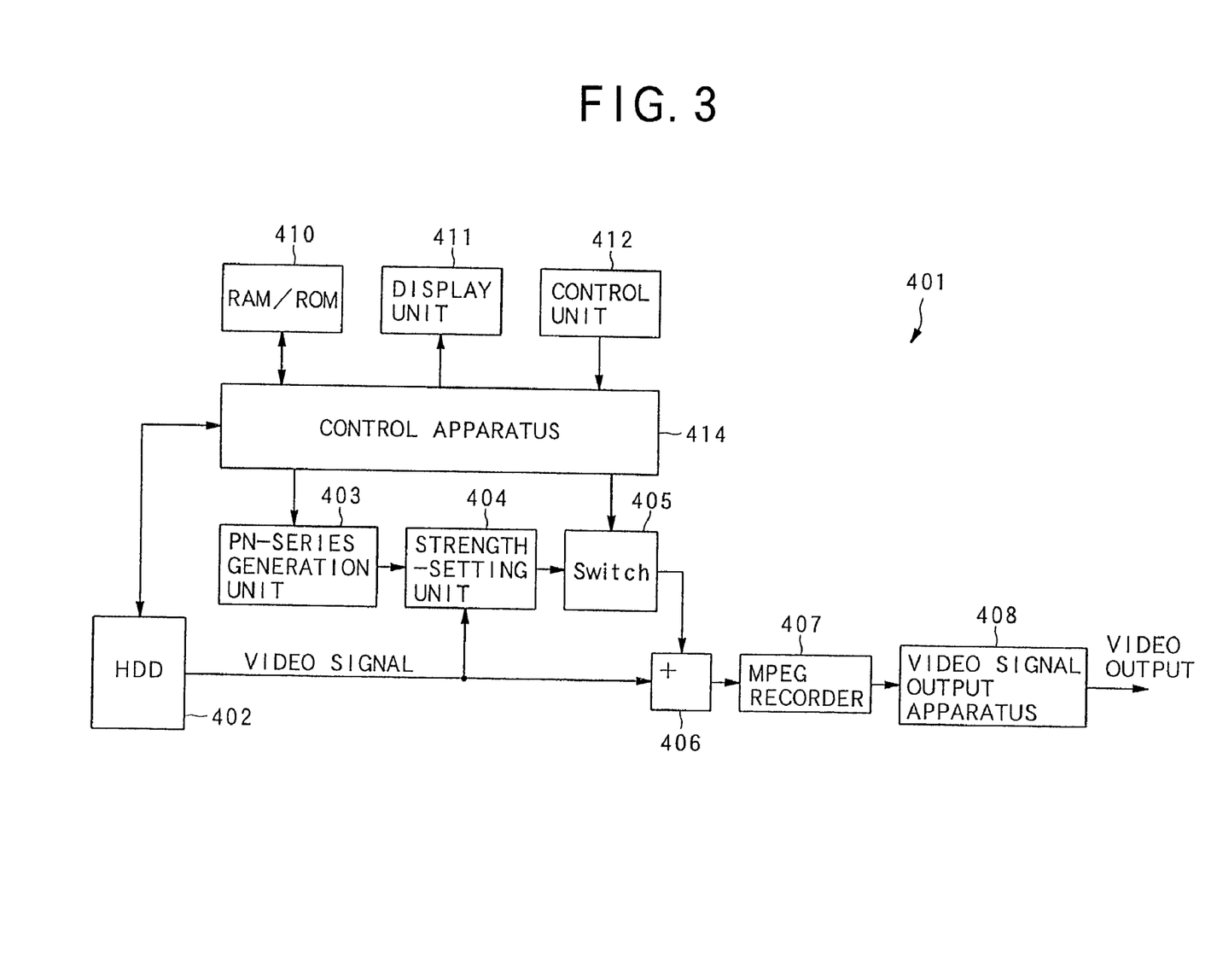
FIG. 3 is a block diagram showing a video transmission apparatus that is installed at a broadcast station.

FIG. 3 is a block diagram showing the video transmission apparatus at the broadcast station.

As shown in FIG. 3, the video transmission apparatus 401 is provided with: a hard disc drive apparatus 402 that drives the hard disc on which the video contents to be transmitted are saved; a PN-series generation unit 403 that generates a PN-series used for the control data; a strength setting unit 404 that amplifies the output signal from the PN-series generation unit 403 and sets the strength of that signal; a control switch 405 that controls adding or removing control data; and adding unit 406 that adds the video contents data and the control data; an MPEG encoder 407 that compresses the video contents data; a video signal output apparatus 408 that outputs the modulated video signal to the transmission antenna; a memory unit 410 having RAM and ROM; a display unit 411 that displays the specific data for the operator; a control unit 412 that receives controls from the operator; and a control apparatus 414 that controls the hard disc drive apparatus 402, PN-series generation unit 403, strength setting unit 404, control switch 405, adding unit 406, MPEG encoder 407, video signal output apparatus 408, memory unit 410, display unit 411 and control unit 412.

The hard disc drive apparatus 402 reads the video contents that are recorded on the hard disc. On the other and, the PN-series generation unit 403 generates a specified PN series (control data). The control apparatus 414 controls the start and end of generation of the PN series by the PN series generation unit 403.

(Watermark Created from the PN Series) Next, the watermark that is embedded in the digital data will be explained using FIG. 4 to FIG. 7.

Figure 4:
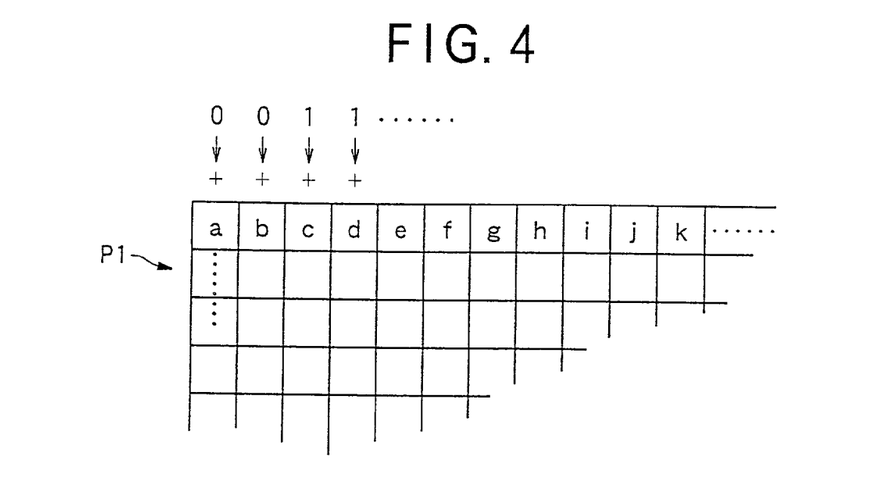
FIG. 4 is a diagram that explains the watermark.
Figure 5:
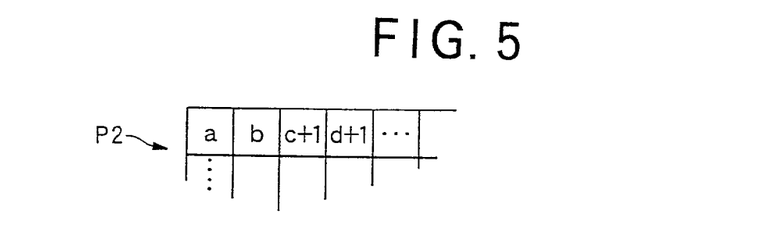
FIG. 5 is a diagram that explains the watermark.

Data that express the brightness of each image of the digital video is included in the digital video. This data for expressing the brightness is, for example, 4 to 8-bit numerical values that correspond to each picture element of the image. In other words, the numerical values for expressing the brightness of each picture element are set individually (hereafter, the numerical values that express the brightness of the picture elements will be called brightness values). Using FIG. 4 to explain this in detail, the image P1 in FIG. 4 is one image of a digital video, and a, b, c, d, . . . in the image P1 are brightness values that are set for the respective picture elements.

The watermark is a signal that is generated according to specific rules, for example, it is created according to a PN (Pseudorandom Noise) series and embedded in the image by adding PN-series codes to each of the brightness values of the picture elements. For example, "0011 . . ." in FIG. 4 is the PN series of the watermark. By adding this PN series to the brightness values a, b, c, d, . . . of the image P1, the brightness values become a, b, c+1. d+1, . . . . The watermark is embedded into the images of the digital video in this way.

Figure 12:
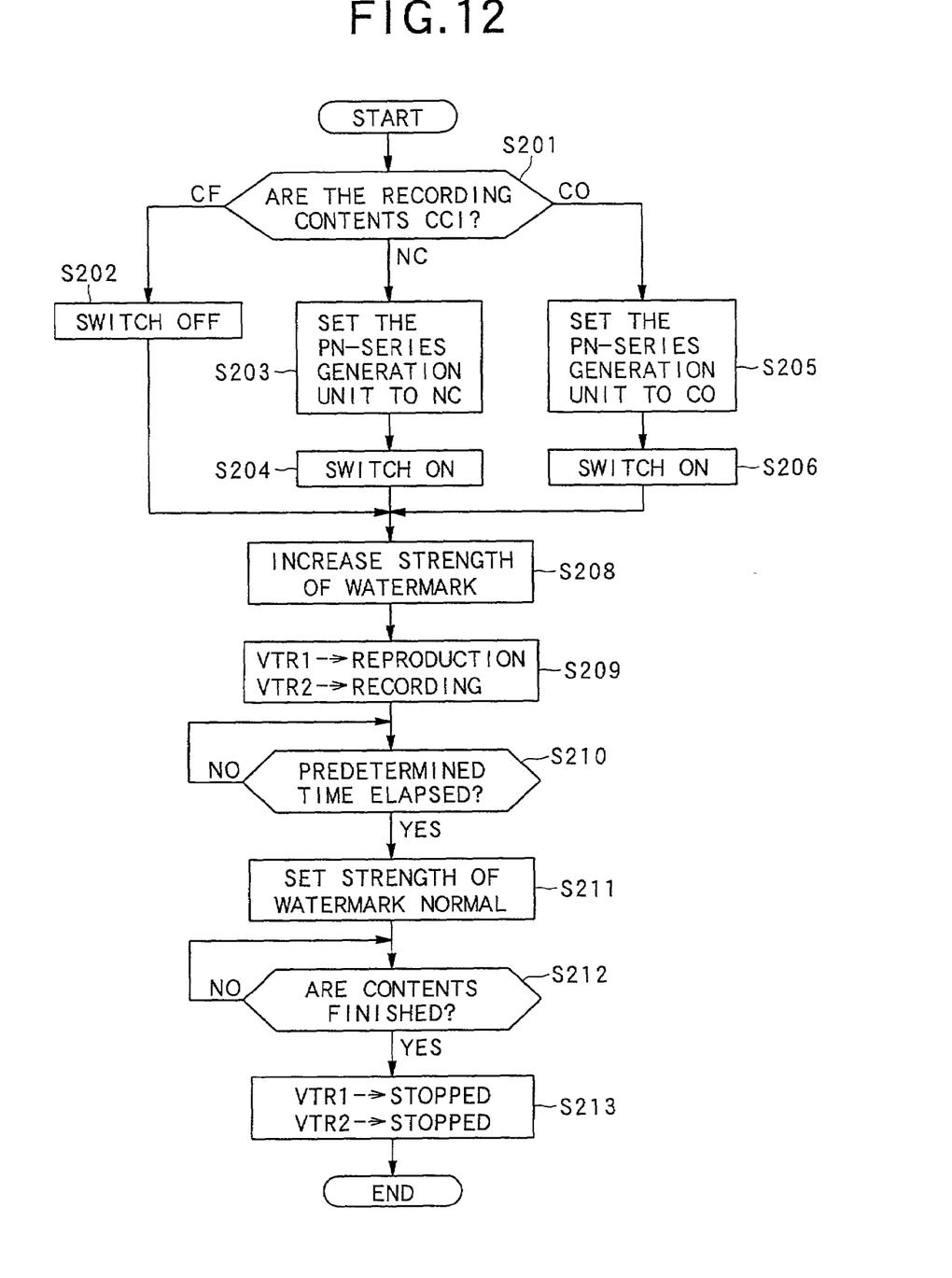
FIG. 12 is a flowchart that shows the processing in a recording system.

The PN series of the watermark, for example, is a pseudorandom code sequence such as an M series, and is generated by giving initial values to the polynomial expression (generating expression) for generating the PN series. In this embodiment, the polynomial expression (generating expression) for generating the PN series, for example, is implemented as a PN-series generating circuit 1 such as shown in FIG. 12. The PN-series generating circuit 1 is provided with shift registers 1A through 1D and an adder 1E, and is placed in the PN-series generating unit 403. The PN series that is actually used has more shift registers such that the period of the series becomes longer.

Also, in this embodiment, two different PN series are generated, and one of these is used as the watermark indicating that first-generation copying is allowed, and the other is used as the watermark indicating that copying is prohibited. By changing either or both the polynomial expression and initial values, the arrangement of random code of the PN series changes. Therefore, it is possible to generate different PN series by changing either or both the polynomial expression and initial values.

Figure 6:
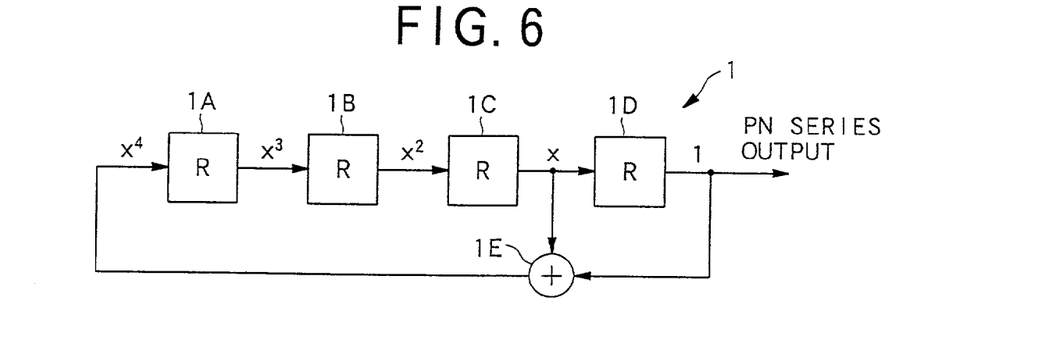
FIG. 6 is a schematic diagram of the PN-series generation circuit.
Figure 7:
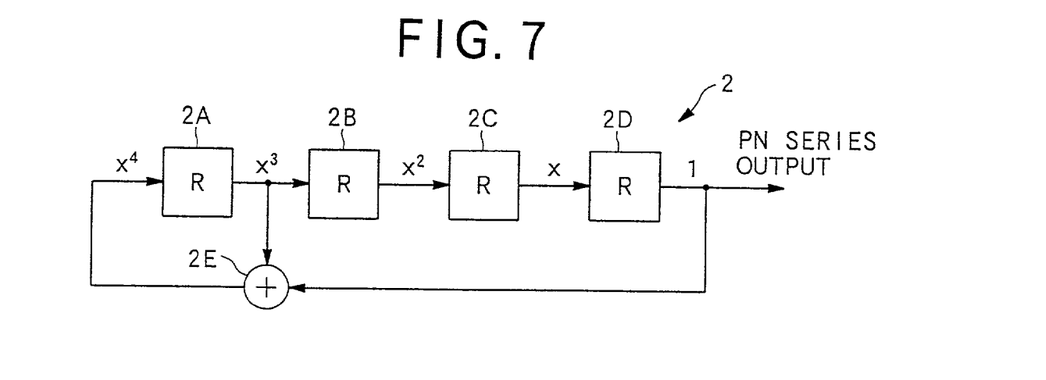
FIG. 7 is a schematic diagram of the PN-series generation circuit.

For example, the PN-series generating circuit 1 shown in FIG. 12 generates the PN series used as the watermark for indicating that first-generation copying is allowed. On the other hand, the PN-series generating circuit 1 shown in FIG. 6 generates the PN series used as the watermark for indicating that copying is prohibited. The PN-series generating circuit 2 shown in FIG. 7 is implemented as the polynomial expression (generating expression) that differs from the polynomial expression (generating expression) that corresponds to the PN-series generating circuit 1, and is provided with shift registers 2 to 2D and adder 2E. The PN-series generating circuit 2 is also placed in the PN-series generating unit 403.

It can be clearly seen that the reason the polynomial expression corresponding to the PN-series generating circuit 1 is different than the polynomial expression corresponding to the PN-series generating circuit 2 is that connection of the shift registers and adder to the PN-series generating circuit 1 and PN-series generating circuit 2 is different. By using two PN-series generating circuits having different connection or construction (or in other words having polynomial expressions with different structure) in this way, it is possible to separately generate the watermark that indicates that first-generation copying is allowed, and the watermark that indicates that copying is prohibited.

It is also possible to use only the PN-series generating circuit 1 shown in FIG. 6 to separately generate the watermark that indicates that first-generation copying is allowed, and the watermark that indicates that copying is prohibited. In this case, two sets of initial values to be given to the PN-series generating circuit 1 are prepared. By assigning one of the two sets of initial values to the PN-series generating circuit 1, it is possible to generate the PN series for the watermark that indicates that first-generation copying is allowed, and by assigning the other set of initial values to the same PN-series generating circuit 1, it is possible to generate the PN series for the watermark the indicates that copying is prohibited. For example, when generating the PN series for the watermark that indicates that first-generation copying is allowed, the initial value '0011' is input to shift register 1A or 1D. On the other hand, when generating the PN series for the watermark that indicates that copying is prohibited, the initial value '0101' is input to shift register 1A or 1D.

(Operation of the Strength-Setting Unit)

The control data that are output from the PN-series generating unit 403 are input to the strength-setting unit 404 and amplified to a suitable strength. In this embodiment, the strength of the control data is forcefully increased at the beginning of each content, namely, during a predetermined time period after each content is started. Therefore, it is possible to detect the control data at the receiver side.

As shown in FIG. 3, the video data that are read by the hard disc drive apparatus 402 are also input to the strength-setting unit 404. In the strength-setting unit 404, the required strength for the control data is calculated according to the input video data.

The control data that are output from the strength-setting unit 404 are input to the control switch 405. The control apparatus 414 controls the switching ON or OFF of the control switch 405. Whether or not a watermark is embedded in the video contents is selected by switching the control switch 405. When the control switch is OFF, no watermark is added to the video contents regardless of the contents from the PN-series generating unit 403. In this case copying of the video is allowed.

Next, normal processing by the strength-setting unit 404, that is, the processing during a time period other than the predetermined time period at the beginning of each content, will be explained.

The strength-setting unit 404 detects the status of the input image and changes the strength of the watermark according to the detected results. That is, the strength-setting unit 404 detects whether there is any large or small change in the brightness value set for each picture element of the image. When there is a large change in the brightness value, that image, for example, has a complex pattern, so the watermark does not stand out even though a watermark may be embedded in the image. Therefore, when there is a large change in the brightness value, the strength-setting unit 404 performs a process on the PN series that is output from the PN-series generating unit 403 in order to increase the strength of the watermark. For example, when the PN series is '0101 . . . ' for example, the series is changed to '0202 . . . ' or '0303 . . . '. The strength-setting unit 404 then outputs the watermark (or in other words, PN series) with increased strength to the control switch 405.

On the other hand, when there is little change in the brightness value set for each picture element of the image, then that image is a flat image, for example, and it is easy for the watermark to stand out. Therefore, when there is little change in the brightness value, the strength-setting unit leaves the PN series that is output from the PN-series generating unit 403 as is and outputs it to the control switch 405.

(Watermark Detection)

Next, detection of the watermark by the video recorder will be explained. As described, before the video recorder 100 records the received digital video onto an optical disk 120, it determines whether or not a watermark is embedded in the digital image, and also determines whether the watermark embedded in the digital video indicates that first-generation copying is allowed or indicates that copying is prohibited. The video recorder 100 detects the watermark and makes the judgment described above by the following method.

First, the PN series for the watermark indicating that first-generation copying is allowed is generated. Also, the codes of that PN series with the value '1' are selected, and the positions of those codes in the PN series are specified. Moreover, the picture elements corresponding to the positions of those codes are specified and the brightness values that are set for those picture elements are read. For example, in FIG. 4, when '0011 . . . ' is taken to be the PN series for the watermark that indicates that first-generation copying is allowed, the brightness values c and d of the image P1 are read. This process is performed for the entire image, and the total brightness value $\alpha 1$ of the read brightness values is calculated.

Next, the codes of the PN series for the watermark indicating that first-generation copying is allowed that are '0' are selected, and the positions of those codes in the PN series are specified. Furthermore, the picture elements corresponding to the positions of those codes are specified and the brightness values that are set for those picture elements are read. For example, in FIG. 10, when '0011 . . . ' is taken to be the PN series for the watermark that indicates that first-generation copying is allowed, the brightness values a and b of the image P1 are read. This process is performed for the entire image, and the total brightness value $\beta 1$ of the read brightness values is calculated.

Next, the difference between the totals $\alpha 1$ and $\beta 1$ is calculated. When a watermark indicating that first-generation copying is allowed has been embedded in the image, the difference between the totals $\alpha 1$ and $\beta 1$ is comparatively large. This is because the total of all the brightness values whose value was increased by '1' by embedding a watermark indicating that first-generation copying is allowed, is $\alpha 1$, and the total of the brightness values whose value did not change by embedding a watermark indicating that first-generation copying is allowed, is $\beta 1$. On the other hand, when a watermark indicating that first-generation copying is allowed is not embedded in the image, the difference between the totals $\alpha 1$ and $\beta 1$ is comparatively small. Therefore, when the difference between the totals $\alpha 1$ and $\beta 1$ is greater than a specified value, it is possible to determine that there is a watermark embedded in the image indicating that first-generation copying is allowed.

Next, the PN series for the watermark that indicates that copying is prohibited is generated. Also, the codes of that PN series with the value '1' are selected, and the positions of those codes in the PN series are specified. Moreover, the picture elements corresponding to the positions of those codes are specified and the brightness values that are set for those picture elements are read. This process is performed for the entire image, and the total brightness value $\alpha 2$ of the read brightness values is calculated.

Next, the codes of the PN series for the watermark indicating that copying is prohibited that are '0' are selected, and the positions of those codes in the PN series are specified. Furthermore, the picture elements corresponding to the positions of those codes are specified and the brightness values that are set for those picture elements are read. This process is performed for the entire image, and the total brightness value $\beta 2$ of the read brightness values is calculated.

Next, the difference between the totals $\alpha 2$ and $\beta 2$ is calculated. When a watermark indicating that copying is prohibited has been embedded in the image, the difference between the totals $\alpha 2$ and $\beta 2$ is comparatively large. This is because the total of all the brightness values whose value was increased by '1' by embedding a watermark indicating that copying is prohibited is $\alpha 2$, and the total of the brightness values whose value did not change by embedding a watermark indicating that copying is prohibited is $\beta 2$. On the other hand, when there is no watermark embedded in the image, or when there is a watermark embedded in the image indicating that first-generation copying is allowed, the difference between the totals $\alpha 2$ and $\beta 2$ is comparatively small. Therefore, when the difference between the totals $\alpha 2$ and $\beta 2$ is greater than a specified value, it is possible to determine that there is a watermark embedded in the image indicating that copying is prohibited.

When the results of the detection described above shows that the difference between both the totals α1 and β1 and totals α2 and β2 is less than the aforementioned threshold value, it is possible to determine that there is no watermark embedded in the image.

In this method of detecting the watermark, the characteristic that the total number of values in the PN-series sequence whose code is '1' and values whose code is '0' is nearly the same, is used. Furthermore, the codes that are '1' and codes that are '0' are evenly distributed in the PN series, so the characteristics that the brightness values of all of the picture elements in an image are divided into two groups according to whether the codes of the PN series are '1' or '0', and that the brightness values are evenly distributed with the group is used.

Also, in this method of detecting the watermark, in order to accurately identify the PN series for the watermark indicating that first-generation copying is allowed, and the PN series for the watermark indicating that copying is prohibited, it is preferred that the PN series for the watermark indicating that first-generation copying is allowed, and the PN series for the watermark indicating that copying is prohibited be orthogonal. When both PN series are orthogonal, for example, when the brightness values of all of the picture elements in an image in which the PN series embedded with a watermark indicating that copying is prohibited are divided into two groups based on the PN series for the watermark indicating that first-generation copying is allowed, the codes of the PN series for the watermark indicating that copying is prohibited are evenly distributed in each group. As a result, the difference between the totals α1 and β1 becomes comparatively small. Similarly, when the brightness values of all of the picture elements in an image in which the PN series embedded with a watermark indicating that first-generation copying is allowed are divided into two groups based on the PN series for the watermark indicating that copying is prohibited, the codes of the PN series for the watermark indicating that first-generation copying is allowed are evenly distributed in each group. As a result, the difference between the totals α2 and β2 becomes comparatively small.

(Processing in the Video Transmission Apparatus)

Next, the steps that are executed in the processing of the video transmission apparatus will be explained in detail.

Figure 8:
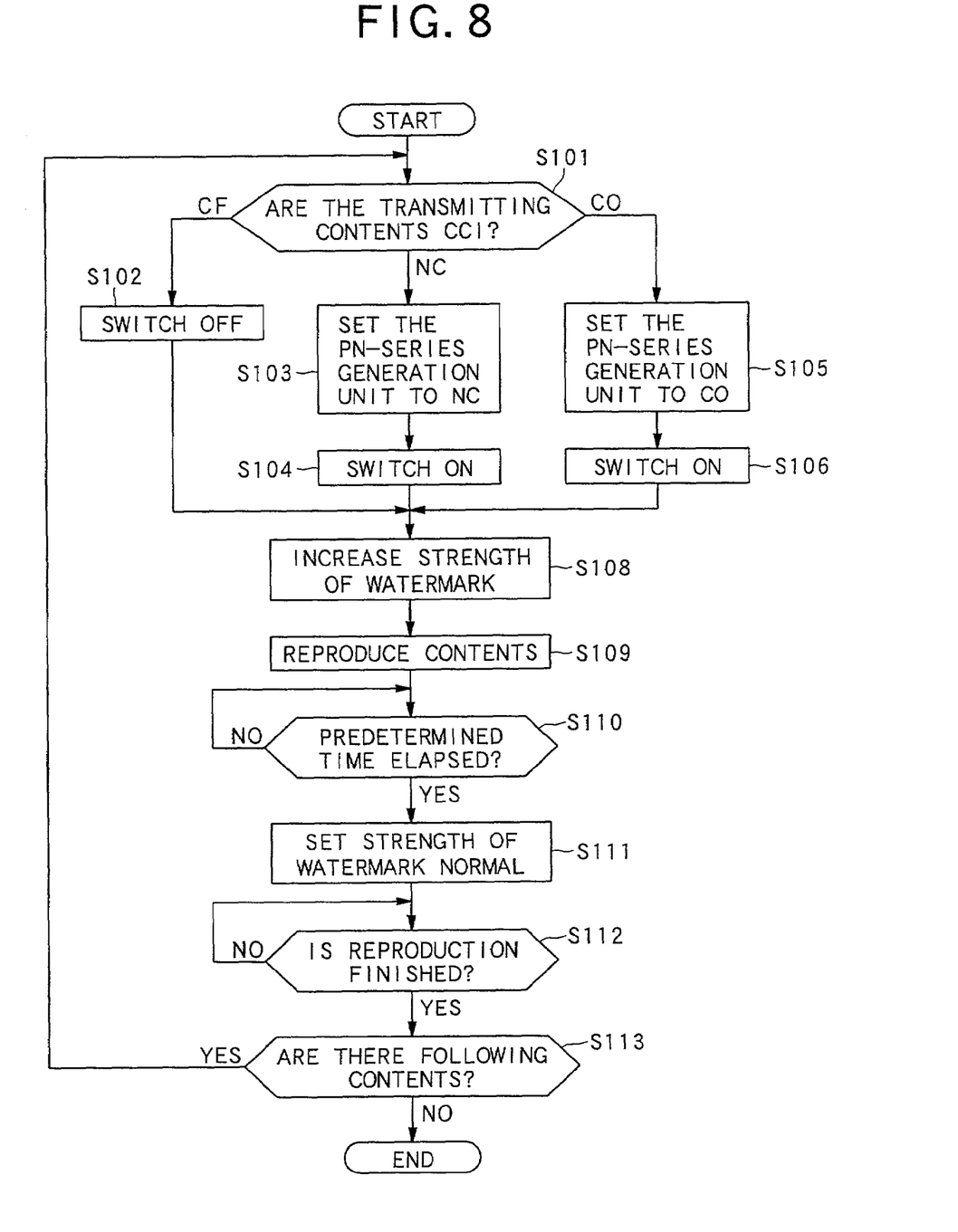
FIG. 8 flowchart showing the process of transmitting video contents by the video transmission apparatus.

FIG. 8 is a flowchart showing the process of transmitting video contents by the video transmission apparatus.

First, in step S101 in FIG. 8, the control data to be transmitted are determined, and when the control data allow copying (CF), processing advances to step S102, when the control data prohibit copying (NC), processing advances to step S103, and when the control data allow first-generation copying (CO), processing advances to step S105.

When processing advances to step S102, the control switch 405 is set to OFF and processing returns to step S108.

When processing advances to step S103, the control data generated by the PN-series generating unit 403 is set to prohibit copying. Next, in step S104, the control switch 405 is set to ON, and then processing returns to step S108.

When processing advances to step S105, the control data generated by the PN-series generating unit 403 is set to allow first-generation copying. Next, in step S106, the control switch 405 is set to ON, and then processing advances to step S108.

In step S108, the processing of increasing the strength of the watermark more than normal is performed. For example, the strength is increased up to a predetermined magnification with respect to normal. Alternatively, the strength can be set to the value obtained by adding a predetermined value to normal.

Next, in step S109, reproduction of the video contents starts. In step S110, it is determined whether or not a predetermined time has elapsed. When the predetermined time has elapsed (YES), processing advances to step S111, however, when the predetermined time has not elapsed (NO), step S112 is repeated.

In step S111, the strength of the watermark is reset to normal. In step S112, it is determined whether or not the reproduction of the video contents is finished. When the reproduction is finished (YES), processing advances to step S113, however, when the reproduction is not finished (NO), step S112 is repeated.

In step S113, it is determined whether or not there are video contents that follow the current video contents is determined, and when there are following video contents (YES), processing returns to step S101, and when there are no following video contents (NO), then the process shown in FIG. 8 ends.

Figure 9:
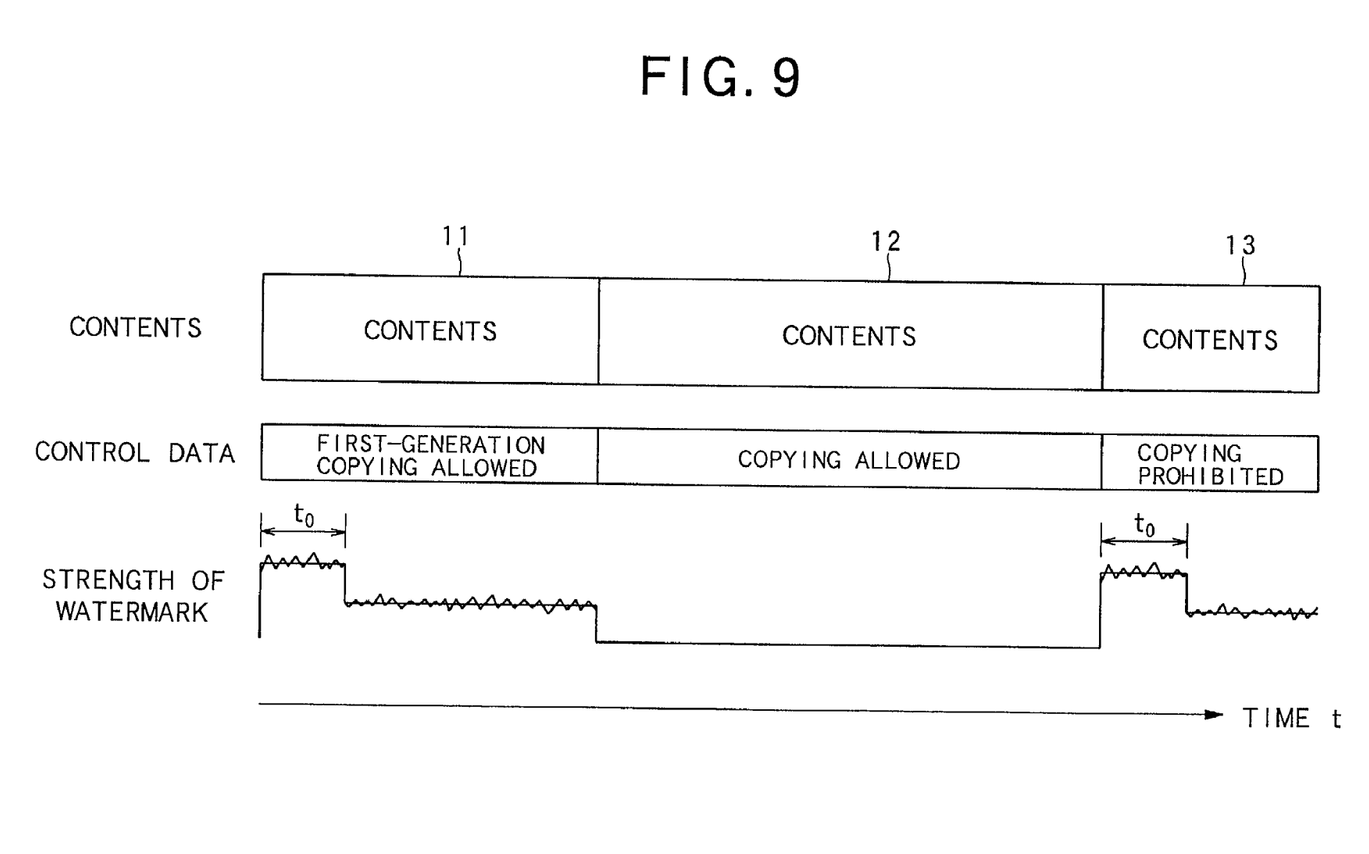
FIG. 9 is a diagram showing the change of a digital watermark according to the process in FIG. 8.

FIG. 9 shows a change of the strength of the watermark according to the process shown in FIG. 8. In FIG. 9, the video contents and control data are changed in the following order: content 11 (control data allowing first-generation copying); content 12 (control data allowing copying); and content 13 (control data prohibiting copying). During a predetermined time to after the content 11 starts and a predetermined time to after the content 13 starts, the strength is increased compared with other time periods (normal time periods).

Therefore, in this embodiment, it is possible to reliably detect the watermark during a short time ($t_0$) after the content 11 or content 13 starts in the video recorder 100. As a result, it is possible to detect the watermark immediately.

Figure 10:
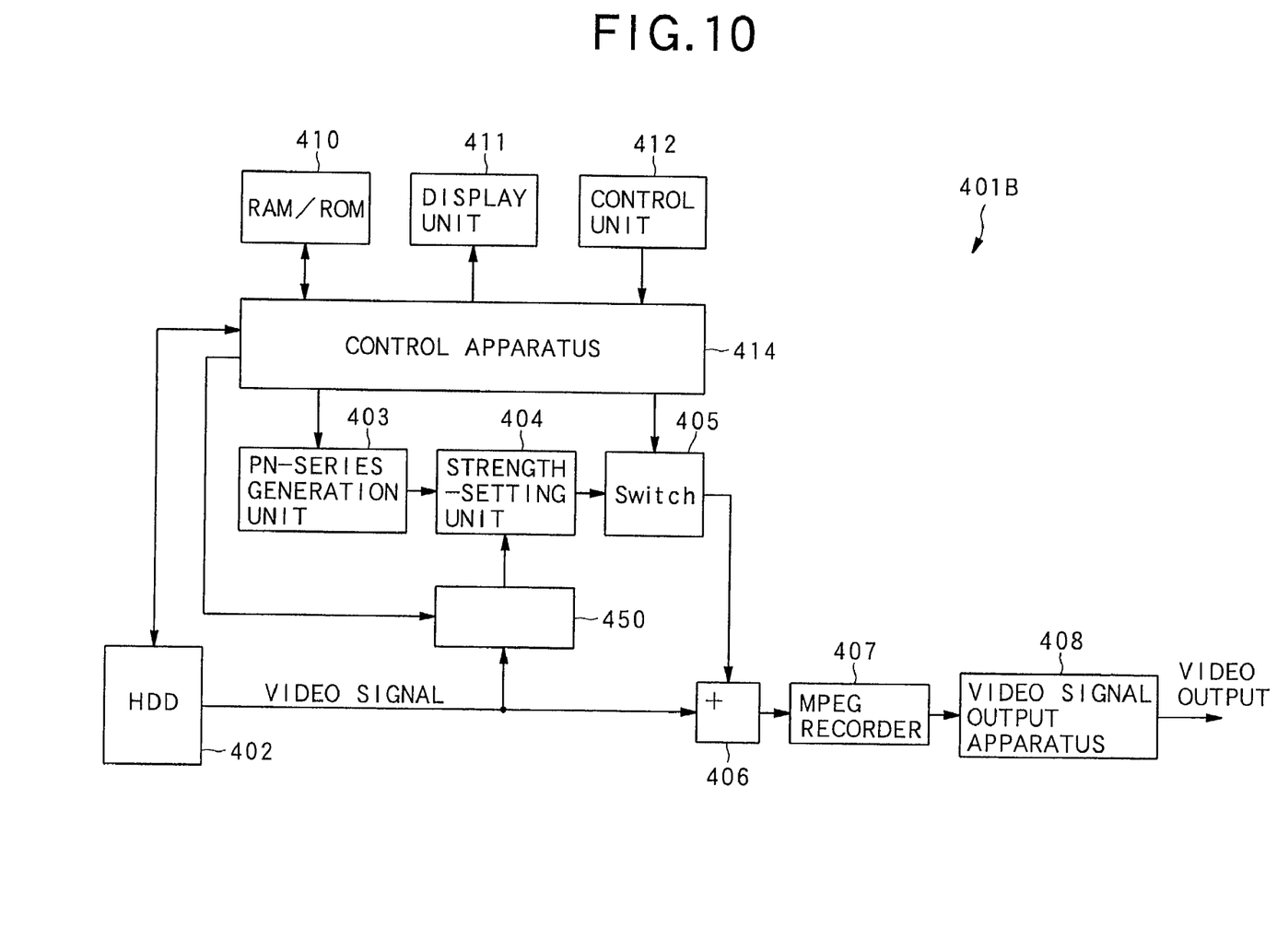
FIG. 10 is a block diagram showing another video transmission apparatus.

FIG. 10 is a block diagram showing a video transmission apparatus 401B used in place of the video transmission apparatus 401 (shown in FIG. 3).

This video transmission apparatus 401B is provided with the same elements or elements that correspond to the video transmission apparatus 401, so the same code numbers will used for parts that are the same or correspond with each other, and any redundant explanation will be omitted.

As shown in FIG. 10, the video transmission apparatus 401B is provided with a switch 450 that is located midway between a video signal line and the strength-setting unit 404, and is controlled by a controller 414B. When the switch 450 is set to OFF, the video signal is not input to the strength-setting unit 404. In the case of using the video transmission apparatus 401B, the switch 450 is set to OFF at the beginning of predetermined contents, and the strength of the watermark is set to a predetermined constant value, which is larger than normal. If a set period of time (to) has elapsed after a predetermined content starts, the switch 450 is set to ON. Therefore, the video signal is input to the strength-setting unit 404, and the strength of the watermark returns to normal.

—Second Embodiment—

Figure 11:
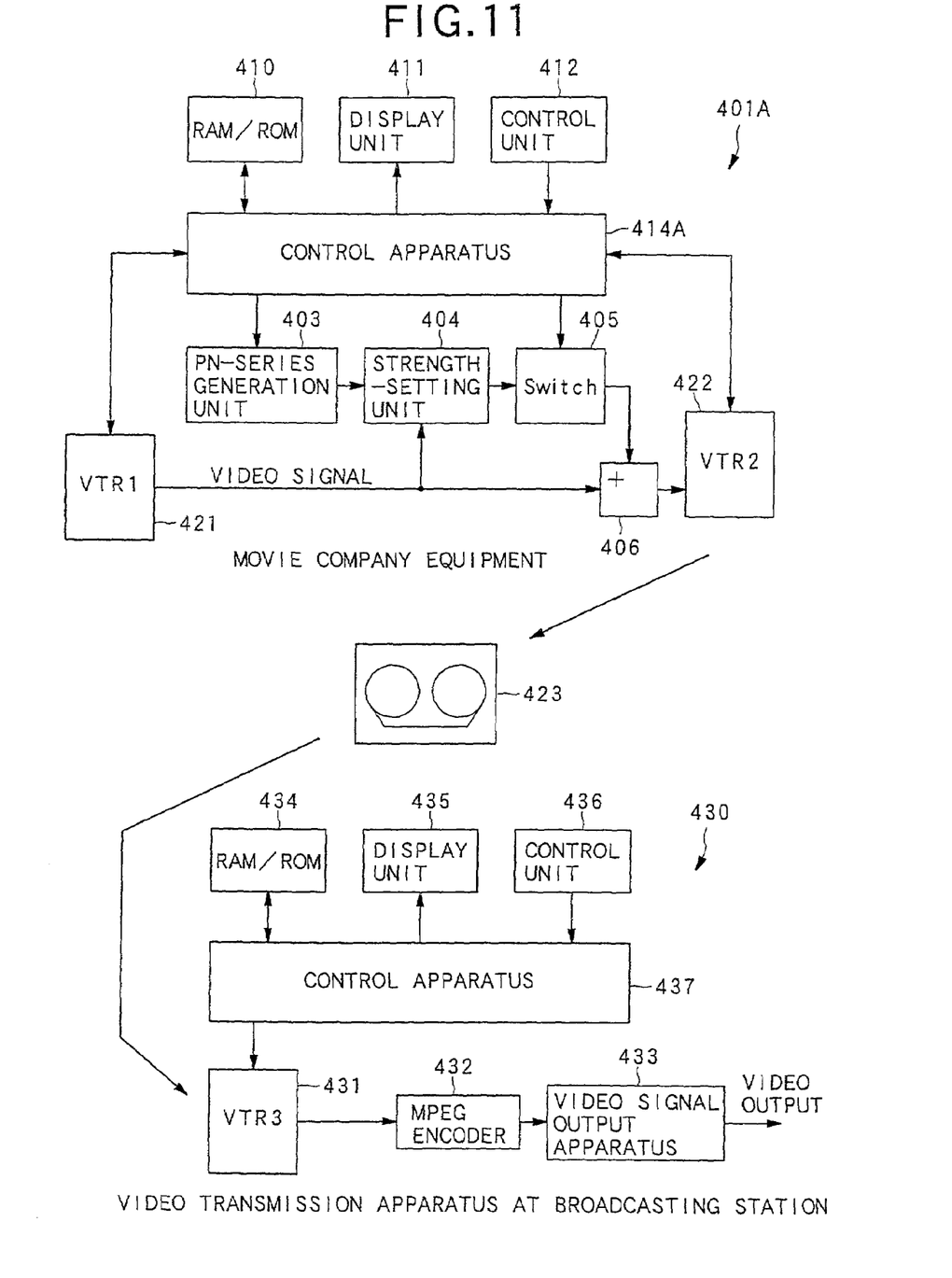
FIG. 11 is a diagram showing the configuration of a system that uses a second embodiment of the digital watermark embedding method.

Next a second embodiment of electronic watermark embedding method of this invention is explained when reference to FIG. 11 to FIG. 12.

FIG. 11 shows the configuration of a system that uses this second embodiment of the digital watermark embedding method. As shown in FIG. 11, this system is provided with, for example, a recording system 401A that is part of the movie company equipment, and the video transmission apparatus 403 at a broadcasting station.

(Recording System)

The recording system 401A will be explained below. This recording system 401A is provided with the same element or elements that correspond to the video transmission apparatus of the first embodiment, so the same code numbers will used for parts that are the same or correspond with each other, and any redundant explanation will be omitted.

As shown in FIG. 11, the video transmission apparatus 40 1A is provided with: a video recorder 421 that reads the video contents to be recorded from a video tape; a video recorder 422 that records the video contents onto a video tape together with the electronic watermark; a PN-series generation unit 403 that generates a PN series to be used as control data; a strength setting unit 404 that amplifies the output signal from the PN-series generation unit 403 and sets the strength of that signal; a control switch 405 that controls adding or removing control data; and adding unit 406 that adds the video contents data and the control data; a memory unit 410 having RAM and ROM; a display unit 411 that displays specific data for the operator; a control unit 412 that receives controls from the operator; and a control apparatus 414A that controls the video recorder 421 on the reproduction side, video recorder 422 on the recording side, PN-series generation unit 403, strength setting unit 404, control switch 405, adding unit 406, memory unit 410, display unit 411 and control unit 412.

Next, the operation of the recording system 401A will be explained. The video recorder 421 reads the video contents that were recorded on videotape. Also, the PN-series generation unit 403 generates a specific PN series (control data). The control apparatus 414A controls the start and end of generating the PN series by the PN-series generation unit 403.

The control data that are output from the PN-series generation unit 403 are input to the strength-setting unit 404 and amplified to a suitable strength. As shown in FIG. 11, the video data that are read by the video recorder 421 are also input to the strength-setting unit 404. The strength-setting unit 404 calculates the required strength for the control data according to the input video data.

The control data that are output from the strength-setting unit 404 are input to the control switch 405. Setting the control switch 405 ON or OFF is controlled by the control apparatus 414A. By switching the control switch 405, it is possible to select whether or not to embed a watermark in the video contents. When the control switch 405 is switched OFF, no watermark is added to the video contents regardless of the processing contents from the PN-series generation unit 403.

FIG. 12 is a flowchart showing the processing of the recording system 401A.

In step S201 in FIG. 12, the control data of the recording contents that are reproduced by the video recorder 421 are judged. When it is determined that the control data indicate that copying is allowed (CF), processing advances to step S202; when it is determined that the control data indicate that copying is prohibited (NC), processing advances to step S203, and when it is determined that the control data indicate that first-generation copying is allowed (CO), processing advances to step S205.

In step S202, the control switch 405 is switched OFF and then processing advances to step S208.

In step S203, the PN series that is generated by the PN-series generation unit 403 is set to prohibit copying, and then in step S204 the control switch is switched ON and processing advances to step S208.

In step S205, the PN series that is generated by the PN-series generation unit 403 is set to allow first-generation copying, and then in step S206 the control switch is switched ON and processing advances to step S208.

In step S208, the processing of increasing the strength of the watermark more than normal is performed. For example, the strength is increased up to a predetermined magnification with respect to normal. Alternatively, the strength can be set to the value obtained by adding a predetermined value to normal.

Next, in step S209, reproduction of the video contents starts. In step S210, it is determined whether or not a predetermined time has elapsed. When the predetermined time has elapsed (YES), processing advances to step S211, however, when the predetermined time has not elapsed (NO), step S210 is repeated.

In step S211, the strength of the watermark is reset to normal. In step S212, it is determined whether or not the reproduction of the video contents is finished. When the reproduction is finished (YES), processing advances to step S213, however, when the reproduction is not finished (NO), step S212 is repeated.

In step S213, the reproduction of the video recorder 412 and recording of the video recorder 422 is terminated, then the process shown in FIG. 12 ends.

According to the above-mentioned processing, the video tape 423 (FIG. 11) in which the video contents and watermarks are recorded is produces. In this video tape 423, the control data is recorded in the state that the strength of the watermark is increased at the beginning of the video contents. This state correspond to that of the content 11 or content 13 in FIG. 9, so that the strength of the watermark is increased during a predetermined time period (to) after the video content starts, compared with other time period (normal time period).

(Video Transmission Apparatus)

Next, the video transmission apparatus 430 shown in FIG. 11 will be explained.

The video transmission apparatus 430 is provided with: a video recorder 431 in which a video tape 423 is set; an MPEG encoder 432 that compresses the signal output from the video recorder 431; a video signal output apparatus 433 that modulates the output signal from the MPEG encoder 432 and outputs it to the antenna; a memory apparatus 434 that contains RAM and ROM; a display unit 435 that provides a display to the operator; a control unit 436 that receives controls from the operator; and a control apparatus 437 that controls the video recorder 431, MPEG encoder 432, video signal output apparatus 433, memory apparatus 434, display unit 435 and control unit 436.

The MPEG encoder 432 compresses the video signal that is output from the video recorder 431. This compressed video signal is modulated by the video-signal output apparatus 433 and transmitted via the antenna.

The video transmission apparatus 430 of this second embodiment differs from the video transmission apparatus 401 (See FIG. 3) of the first embodiment, and it transmits the video together with the watermark that was recorded beforehand on the videotape without changing the construction in order to add the control data (watermark).

However, in this embodiment, the strength of the watermark is increased at the beginning of the video contents in data itself recorded in the video tape as mentioned above, so that it is possible to detect the watermark immediately at the receiver side without making a special modification at the broadcasting station side.

Figure 13:
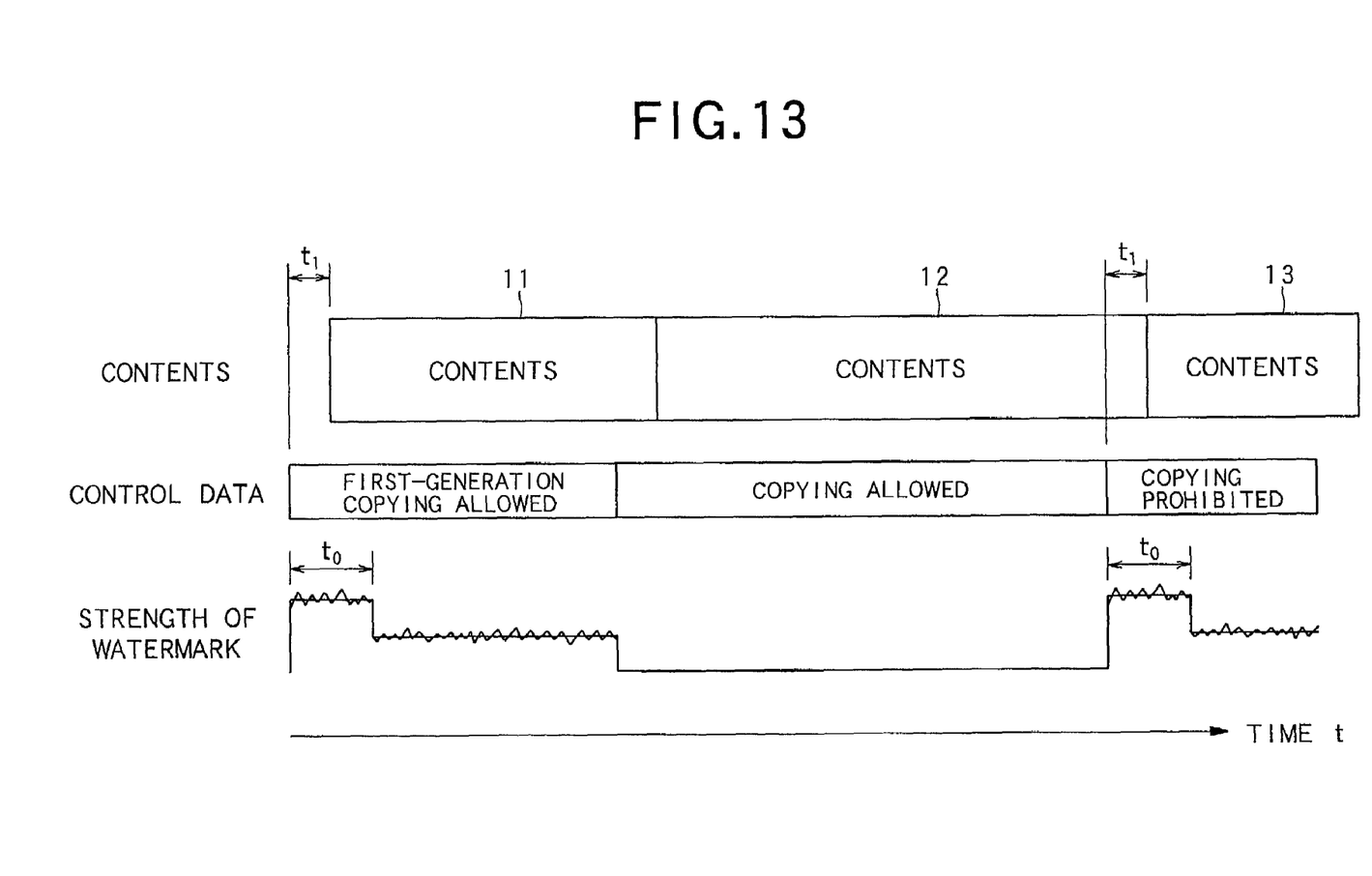
FIG. 13 is a diagram showing the positional relationship between the video contents that are recorded on videotape and the control data (watermark).

In each embodiment explained above, as shown in FIG. 9, the case where the timing of the beginning of video contents coincides with that of the beginning of the watermark was explained. However, as shown in FIG. 13, the timing of the beginning of the watermark corresponding to the video contents can be set to a predetermined time $t_1$ earlier than that of the beginning of the video contents. In this case, since the watermark is transmitted prior to the video contents, it is possible to compensate for the time to detect the watermark at the receiver side, and to bring the timing for detecting the watermark close to that of the beginning of the video contents sufficiently. Therefore, control timing for allowing/prohibiting copying at the receiver side can be more appropriate than that in the first embodiment.

By making the time stagger $t_1$ of the beginning of the watermark coincide with the time to detect the watermark in the video recorder 100, it is possible to make the timing of detecting the watermark coincide with that of the beginning of actual video contents. However, the time to detect the watermark varies depending on the type of video recorder. Therefore, in the case of reliably prohibiting copying from the beginning of the video contents, for example, it is preferable to adapt the time stagger to the type of video recorder in which the time to detect the watermark is long. That is, it is preferable to set the time stagger $t_1$ to the same time to detect the watermark in the type of video recorder in which the time to detect the watermark is long, or to set the time stagger $t_1$ to a longer time than the time to detect the watermark in the type of video recorder in which the time to detect the watermark is long.

In the embodiments described above, the PN series for the watermark was added to the brightness value that is set for each picture element of the image, however, the invention is not limited to this, and the PN series for the watermark can be added to another value that is set for each picture element.

Also, the PN series for the watermark is not limited to being an M series. It is also possible to use another random series such as gold code.

Moreover, in the aforementioned embodiment, an example of creating the watermark from a PN series was given, however, the invention is not limited to this. For example, the watermark may be constructed by another signal in which code is arranged such that it is not possible to easily determine the rules of the signal in the case when there are rules for the random or close to random codes or code array.

Furthermore, in the aforementioned embodiments, an example of the case where the codes of the PN series corresponds one-to-one with the pictures elements of an image was given, however the invention is not limited to this. For example, the image can be divided into a plurality of areas made up of a plurality of adjacent picture elements, and the codes of the PN series can correspond one-to-one with these areas. Here, an example of embedding the PN series '0101 . . . ' for the watermark indicating that copying is prohibited in an image that is divided into square areas containing four joining picture elements will be given. In this case, '0' is added to all of the brightness values of the four picture elements that are contained in the first area of the image. Also, '1' is added to all of the brightness values of the four picture elements that are contained in the second area of the image. By having one-to-one correspondence between the codes of the PN series and the plurality of areas of picture elements in this way, it is possible for the watermark to remain in the digital video even when the digital video is filtered or compressed.

Further, in the above embodiments, the case where the present invention is adapted to video contents that are broadcast was explained. However, the present invention can be adapted to video contents that are recorded in a package medium such as a video tape, DVD, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-35006 filed on Feb. 13, 2001 including the specification, claims, drawings and summary is incorporated herein by reference in its entirety.

What is claimed is:

1. A digital watermark embedding method of embedding a digital watermark, which is a signal generated according to specific rules, in contents comprising digital data, the method comprising the processes of:
    increasing a strength of the digital watermark forcefully during a predetermined time period at a beginning of the digital watermark corresponding to the contents; and
    embedding the digital watermark in the contents.

2. The digital watermark embedding method according to claim 1, wherein
    the process of increasing the strength sets the strength of the digital watermark to a constant value during said predetermined time period.

3. The digital watermark embedding method according to claim 1, wherein
    the process of increasing the strength increases the strength of the digital watermark during said predetermined time period up to a predetermined magnification with respect to the strength in the other time period.

4. The digital watermark embedding method according to claim 1, wherein
    the process of increasing sets the strength of the digital watermark during said predetermined time period to a predetermined value obtained by adding a constant value to the strength in the other time period.

5. The digital watermark embedding method according to claim 1, wherein
    the process of embedding the digital watermark embeds the digital watermark in the contents such that an output timing of the beginning of the digital watermark is prior to a beginning of the contents.

6. A digital watermark embedding apparatus for embedding a digital watermark, which is a signal generated according to specific rules, in contents comprising digital data, the apparatus comprising:
    a strength increasing device for increasing a strength of the digital watermark forcefully during a predetermined time period at a beginning of the digital watermark corresponding to the contents; and
    an embedding device for embedding the digital watermark in the contents.

7. The digital watermark embedding apparatus according to claim 6, wherein the strength increasing device sets the strength of the digital watermark during said predetermined time period to a constant value.

8. The digital watermark embedding apparatus according to claim 6, wherein the strength increasing device increases the strength of the digital watermark during said predetermined time period up to a predetermined magnification with respect to the strength in the other time period.

9. The digital watermark embedding apparatus according to claim 6, wherein the strength increasing device sets the strength of the digital watermark during said predetermined time period to a predetermined value obtained by adding a constant value to the strength in the other time period.

10. The digital watermark embedding apparatus according to claim 6, wherein the embedding device embeds the digital watermark in the contents such that a beginning of the digital watermark is prior to a beginning of the contents.

* * * * *